US008053117B2

(12) United States Patent  
Dewey

(10) Patent No.: US 8,053,117 B2  
(45) Date of Patent: Nov. 8, 2011

(54) FCPM FREEZE START HEATER

(75) Inventor: Scott Dewey, Dansville, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2115 days.

(21) Appl. No.: 10/864,716

(22) Filed: Jun. 9, 2004

(65) Prior Publication Data

US 2005/0277003 A1 Dec. 15, 2005

(51) Int. Cl.  
*H01M 8/00* (2006.01)  
*H01M 8/04* (2006.01)

(52) U.S. Cl. ........................................ 429/400; 429/428

(58) Field of Classification Search .................. 429/400, 429/428  
See application file for complete search history.

(56) References Cited

U.S. PATENT DOCUMENTS

| | | | |
|---|---|---|---|
| 4,650,729 A | 3/1987 | Nakamura et al. | |
| 5,299,594 A * | 4/1994 | Lord et al. ............... | 137/101.19 |
| 6,186,254 B1 * | 2/2001 | Mufford et al. ............... | 180/65.3 |
| 6,986,959 B2 * | 1/2006 | Clark et al. ..................... | 429/22 |
| 7,179,556 B2 | 2/2007 | Saito et al. | |
| 2002/0027504 A1 * | 3/2002 | Davis et al. ................... | 340/540 |
| 2005/0129991 A1 * | 6/2005 | Breault ........................... | 429/13 |

FOREIGN PATENT DOCUMENTS

| | | |
|---|---|---|
| DE | 101 07 596 A1 | 10/2002 |
| DE | 11 2004 001359 T5 | 7/2006 |

* cited by examiner

*Primary Examiner* — Karie O'Neill Apicella  
(74) *Attorney, Agent, or Firm* — John A. Miller; Miller IP Group, PLC

(57) ABSTRACT

A fuel cell system that employs a start-up heater. The heater is coupled to a cold plate that warms a stack coolant during system start-up. A heater circuit measures the voltage at the output of the fuel cell stack and across the heater and the current through the fuel cell stack and through the heater. The heater circuit controls the amount heat that the heater generates by the measured voltage and current and the available power at the output of the fuel cell stack. In one embodiment, the heater includes field effect transistors (FETs) and planar resistors directly mounted to the cold plate. The FETs operate in their linear mode, allowing only the amount of current, which is required at a given voltage, to produce the power needed from the stack.

16 Claims, 8 Drawing Sheets

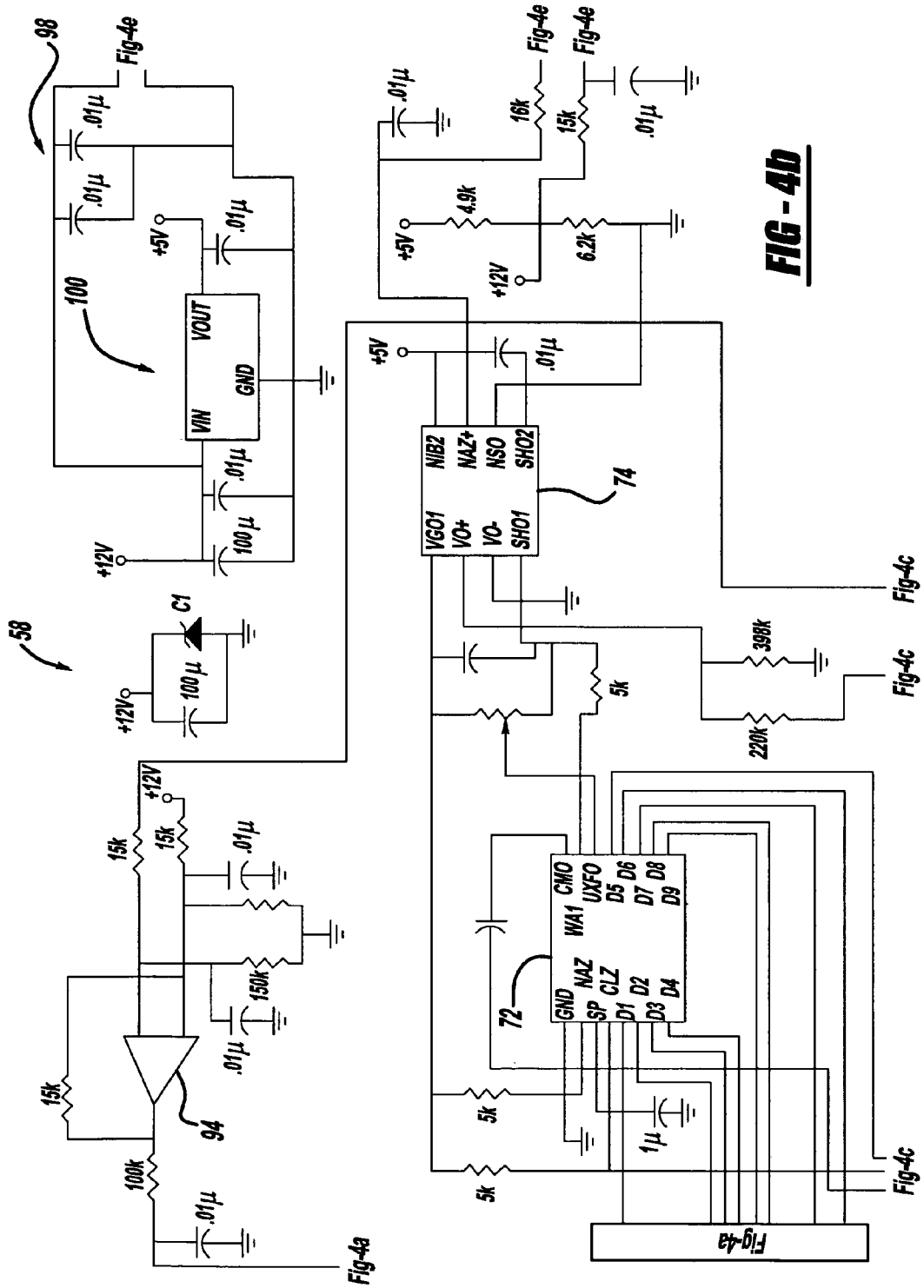

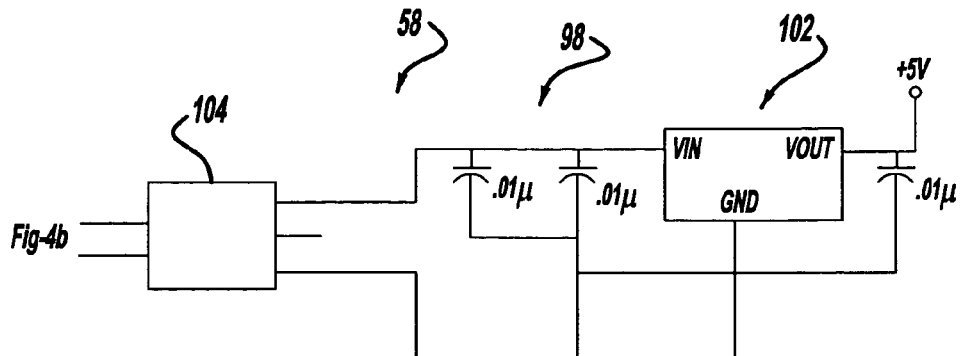
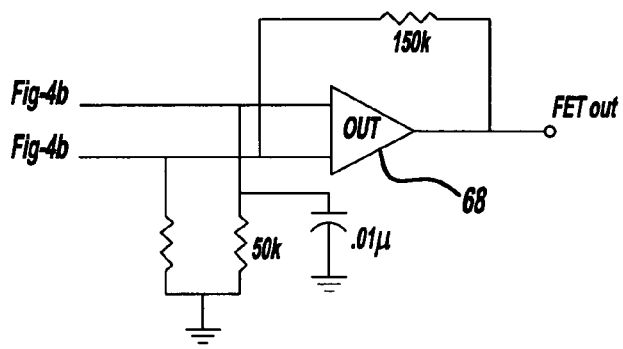
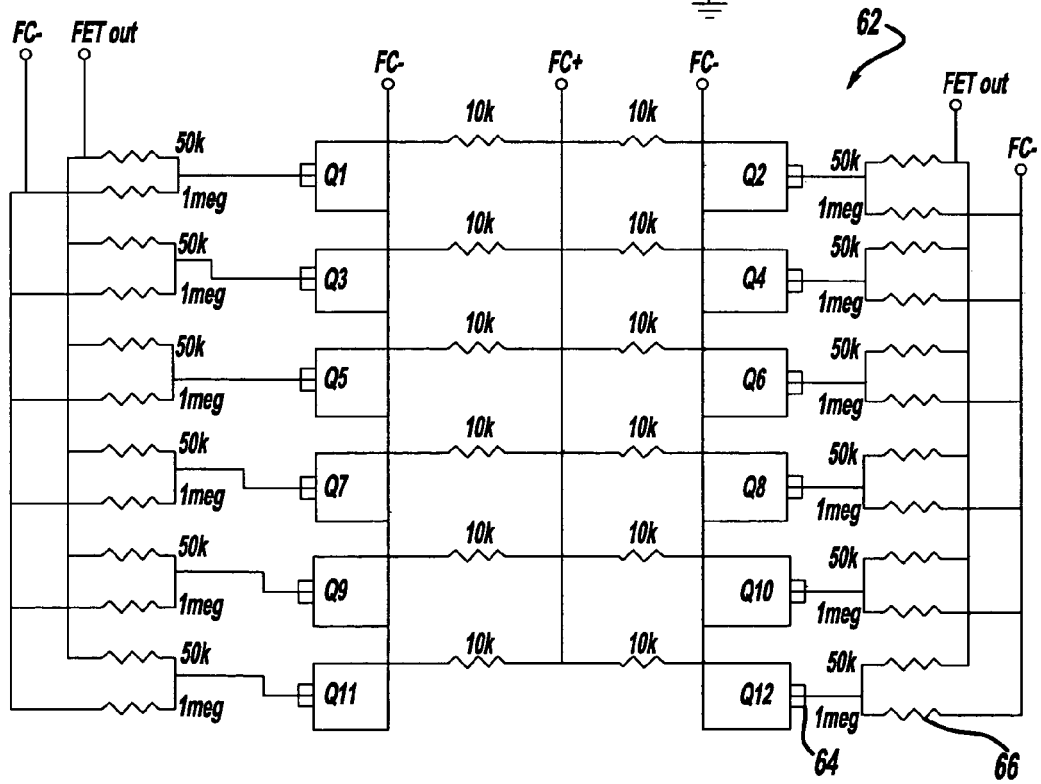
FIG - 4e

FCPM FREEZE START HEATER

BACKGROUND OF THE INVENTION

1. Field of the Invention

This invention relates generally to a start-up heater for a fuel cell system and, more particularly, to a start-up heater for a fuel cell system, where the heater is coupled to a cold plate that warms the cooling fluid and fuel cell stack at system start-up.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is disassociated in the anode, typically by a catalyst, to generate free hydrogen protons and electrons. The hydrogen protons pass through the electrolyte to the cathode. The hydrogen protons react with the oxygen and the electrons in the cathode, typically by a catalyst, to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perfluorinated acid membrane. The anode and cathode typically include finely divided catalytic particles, usually platinum (Pt), supported on carbon particles and mixed with an ionomer. The combination of the anode, cathode and membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Many fuel cells are typically combined in a fuel cell stack to generate the desired power. For example, a typical fuel cell stack for a vehicle may have two hundred stacked fuel cells. The fuel cell stack receives a cathode input gas as a flow of air, typically forced through the stack by a compressor. Not all of the oxygen in the air is consumed by the stack and some of the air is output as a cathode exhaust gas that may include water as a stack by-product. The fuel cell stack also receives an anode hydrogen input gas that flows into the anode side of the stack.

The membranes in the fuel cell stack must have a certain wetness or humidity level for proper stack operation. When the fuel cell system is turned off in a sub-zero temperature environment, any remaining water within the stack generally freezes. When the fuel cell system is turned back on, it will not be able to immediately generate the desired output power because the water in the stack is frozen and the stack is so far below its operating temperature. Therefore, starting a fuel cell system from sub-zero temperatures is a significant problem in a fuel cell system design.

Currently, it is known to selectively switch the output of the fuel cell stack to a resistor bank that operates as a temporary load during system start-up. The stack will gradually increase its operating temperature through the stack inefficiencies, i.e., the plate-to-plate resistances, over time as the fuel cell operates and the output power is being dumped to the resistor bank. However, this process takes a relatively long time, and thus improvements to fuel cell system start-up at sub-zero temperatures are needed.

SUMMARY OF THE INVENTION

In accordance with the teachings of the present invention, a fuel cell system that employs a start-up heater is disclosed. The heater is coupled to a cold plate that warms a stack coolant during system start-up to heat the fuel cell stack more quickly. The heater is controlled by a heater circuit. The heater circuit measures the voltage at the output of the fuel cell stack and across the heater. The heater circuit also measures the current through the fuel cell stack and through the heater. The heater circuit controls the amount of heat that the heater generates by the measured voltage and current, and thus the available power at the output of the fuel cell stack.

In one embodiment, the heater includes field effect transistors (FETs) and planar resistors directly mounted to the cold plate. The heater circuit calculates the amount of voltage needed at the gate terminals of the FETs based on the available output power from the stack to determine the amount of heat to be generated by the resistors.

Additional advantages and features of the present invention will become apparent from the following description and appended claims, taken in conjunction with the accompanying drawings.

BRIEF DESCRIPTION OF THE DRAWINGS

FIGS. 4(a)-4(e) show a detailed schematic diagram of a fuel cell system including a start-up heater, according to the invention.

DETAILED DESCRIPTION OF THE EMBODIMENTS

The following discussion of the embodiments of the invention directed to a heater for heating a fuel cell stack during fuel cell system start-up is merely exemplary in nature, and is in no way intended to limit the invention or its applications or uses. For example, the discussion herein describes a fuel cell system for a vehicle. However, as will be appreciated by those skilled in the art, the invention has application for fuel cell systems employed for other purposes.

Figure 1:
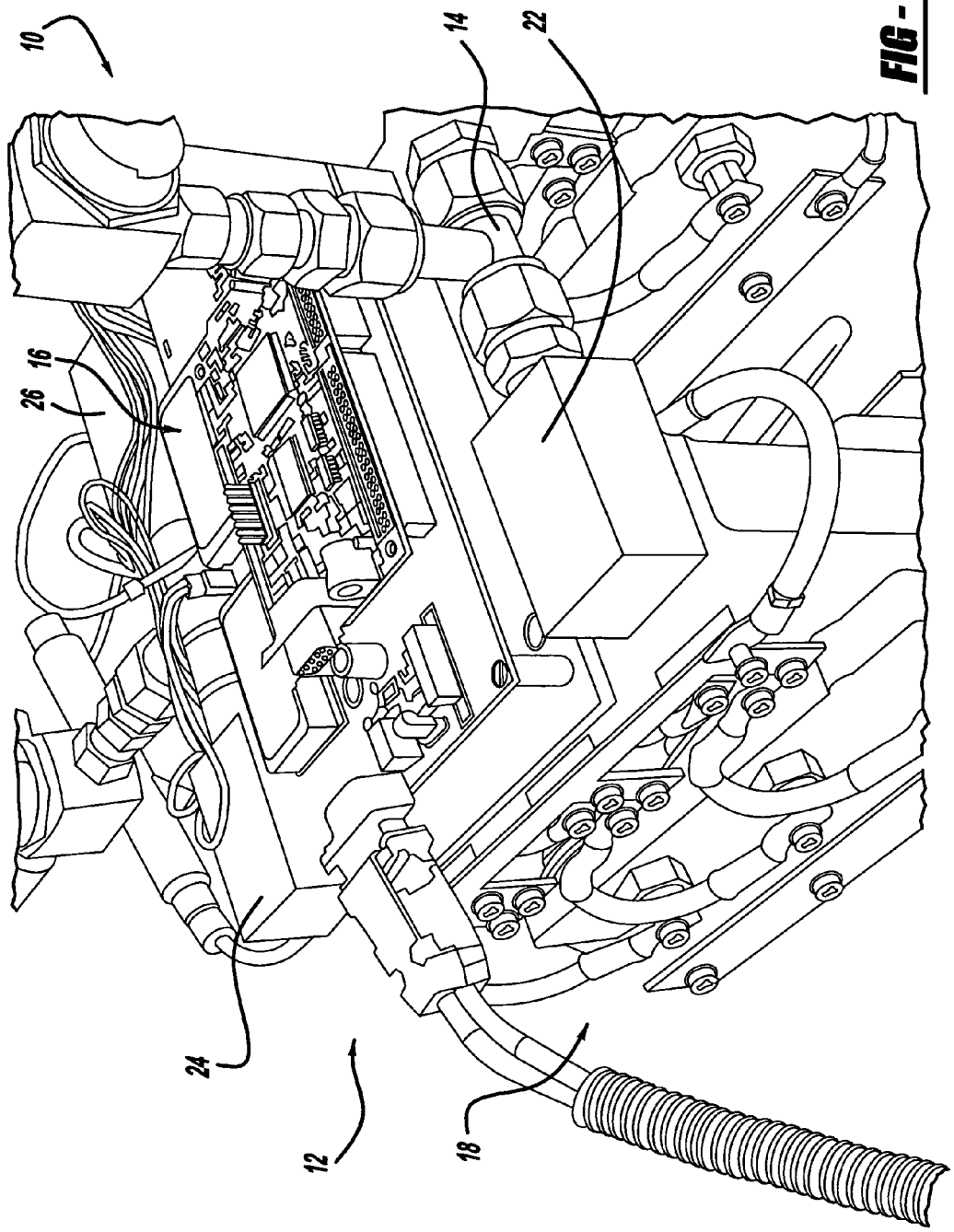
FIG. 1 is a perspective view of a fuel cell system employing a start-up heater, according to an embodiment of the present invention.

FIG. 1 is a perspective plan view of a fuel cell system 10 in a vehicle including a fuel cell stack and a heater unit 12, where the stack is cooled by a cooling fluid flowing through pipes 14. The heater unit 12 includes a control board 16 that ensures that the proper amount of power is removed from the fuel cell stack. The heater unit 12 draws power from the fuel cell stack during system start-up, which is used to heat sink blocks 22, 24 and 26 or cold plates through which the coolant fluid from the coolant pipes 14 flows.

In one embodiment, the heater unit 12 includes a bank of power resistors and field effect transistors (FETs) 18, where the FETs 18 control the amount of power dissipated by the resistors. The heat dissipated through the heat sink blocks 22-26 will warm the coolant fluid, and thus warm the stack as it flows therethrough. As will be discussed in more detail below, the control board 16 monitors the stack voltage and the current through the heater unit 12, and controls the amount of power the heater unit 12 draws from the fuel cell stack as it is being heated based on the amount of stack power that is available. The FETs 18 operate in their linear mode, allowing only the amount of current, which is required at a given voltage, to produce the power needed from the stack.

Figure 2:
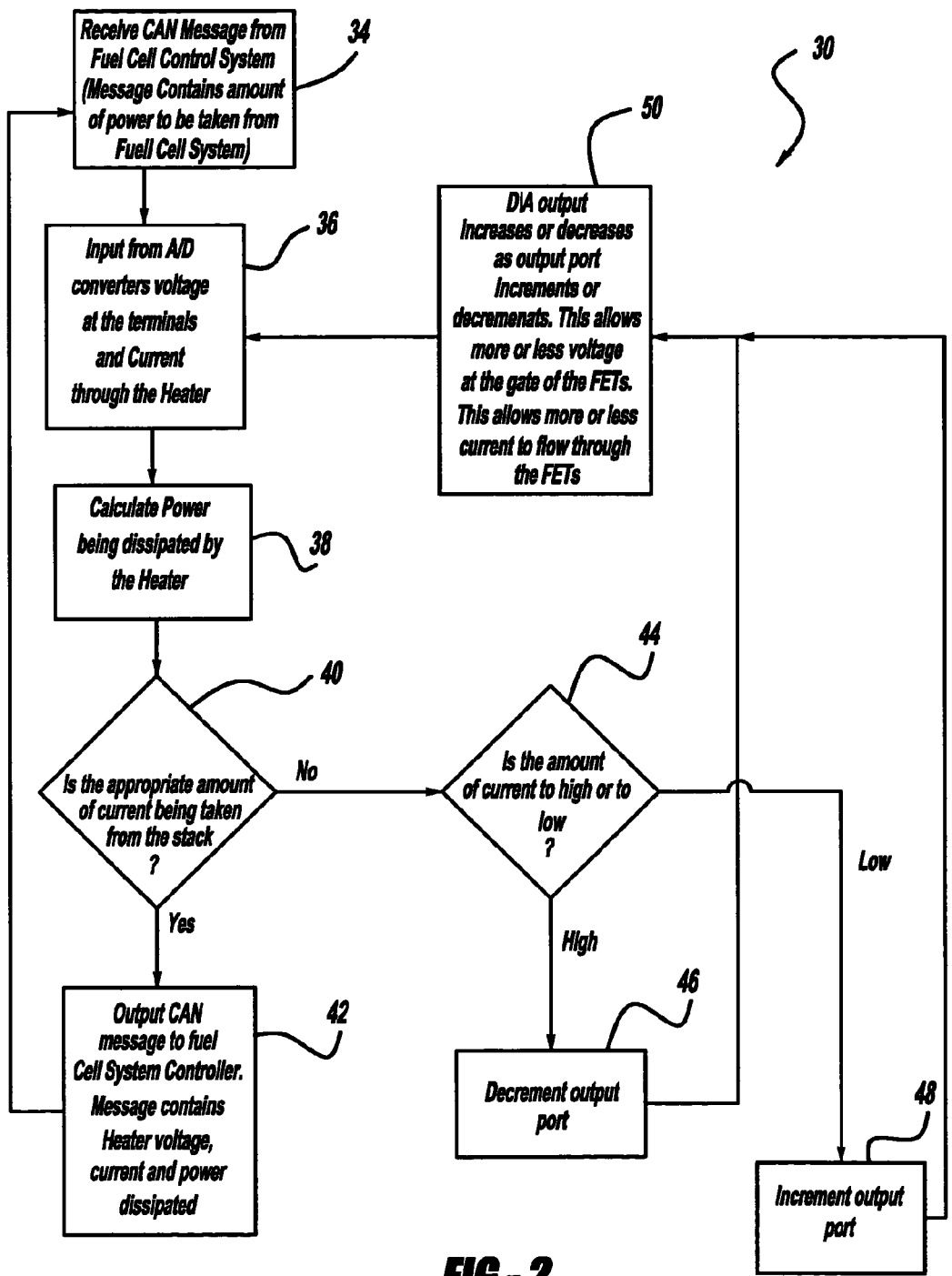
FIG. 2 is a flow chart diagram showing a process for cold starting a fuel cell system, according to an embodiment of the present invention.

FIG. 2 is a flow chart diagram 30 showing the operation of heating the fuel cell stack during system start-up, according to the invention. The control board 16 receives a CAN message that includes the amount of output power to be drawn from the fuel cell stack based on the available stack output power at block 34, so that the control board 16 can verify that the proper amount of current is being taken from the stack. The control board 16 then determines the inputs at the analog-to-digital (A/D) converter of the control board 16, the voltage at the output terminals of the fuel cell stack and the current through the heater unit 12 at block 36. The control board 16 then calculates the power being dissipated by the heater unit 12 at block 38.

The control board 16 then determines if the proper amount of current is being taken from the fuel cell stack at decision diamond 40 based on the current power output capabilities of the stack. If the proper amount of current is being taken from the fuel cell stack, then the control board 16 generates an output CAN message including the voltage output of the heater unit 12, the current through the heater unit 12 and the power dissipated by the heater unit 12 at block 42 that is received at the block 34.

If the proper amount of current is not being taken from the stack at the decision diamond 40, then the control board 16 determines if the amount of current is too high or too low at decision diamond 44. If the amount of current taken from the stack is too high, the control board 16 decrements the output port of the D/A converter of the control board 16 at block 46, and the D/A output decreases at block 50, which reduces the A/D converter voltage at the block 36. Decreasing the D/A output provides less voltage at the gate terminals of the FETs 18 in the heater unit 12, which reduces the power to the power resistors.

If the amount of current being taken from the stack is too low, the control board 16 increments the output port of the D/A converter of the control board 16 at block 48, and the D/A output increases at the block 50, which increases the A/D voltage at the block 36. Increasing the D/A output provides more voltage at the gate terminal of the FETs 18 in the heater unit 12, which increases the power to the power resistors. Thus, the system 10 controls the amount of current being drawn from the fuel cell stack as it is coming up to temperature so that all of the available current can be used to heat the heater unit 12, which in turn heats the heat sink blocks 22-26 and then the coolant fluid flowing through the coolant pipe 14. This increases the speed at which the fuel cell stack comes up to its operating temperature.

Figure 3:
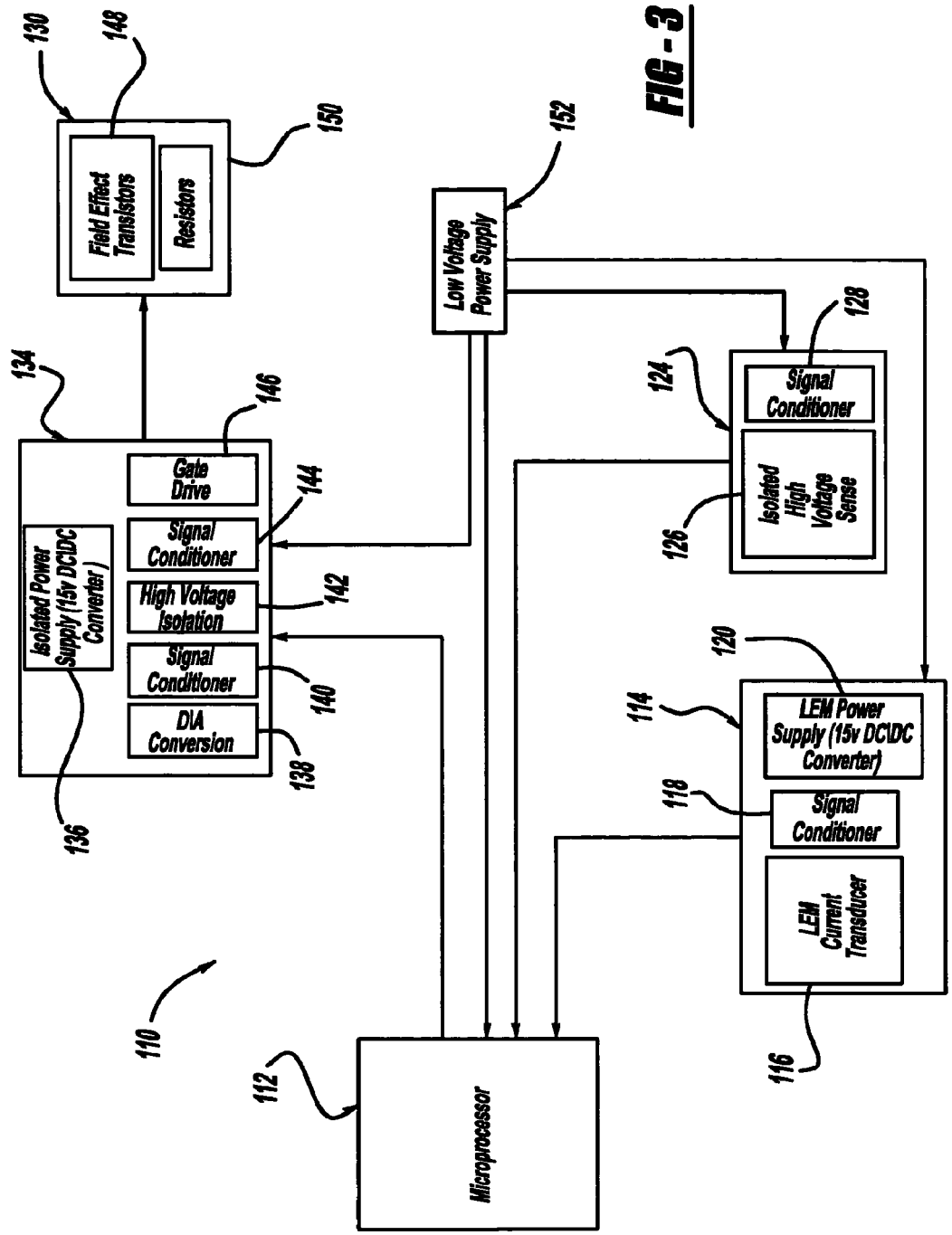
FIG. 3 is a block diagram of a fuel cell system including a start-up heater, according to an embodiment of the present invention.

FIG. 3 is a block diagram 110 of the control board 16. The control board 16 includes a microprocessor 112, such as the TMS320LF2407 that controls the operation of the control board 16. A heater 130 heats the coolant fluid consistent with the discussion herein. A current sensing system 114 measures the current through the stack. The current sensing system 114 includes an LEM current transducer 116 for measuring the current from the fuel cell stack and the heater 130, a signal conditioner 118 for conditioning the signal from the current transducer 116 and a current sensor power supply 120 for supplying power to the sensing system 114. The conditioned current signal is sent to the microprocessor 112. A voltage measuring system 124 measures the output voltage of the stack. The voltage measuring system 124 includes an isolated high voltage sensor 126 for measuring the voltage across the fuel cell stack and the heater 130, and a signal conditioner 128 for conditioning the signal from the voltage sensor 126. The conditioned voltage signal is sent to the microprocessor 112.

As discussed above, the microprocessor 112 determines how much power the heater 130 should draw based on a CAN message sent to the microprocessor 112. The microprocessor 112 determines how much power is being consumed from the measured voltage and current readings. The heater control signal from the microprocessor 112 is first sent to a load control system 134. The load control system 134 includes a D/A converter 138 for converting the digital control signal from the microprocessor 112 to a representative analog signal for the heater 130. The load control system 134 further includes a first signal conditioner 140 for conditioning the low voltage analog signal from the D/A converter 138, a high voltage isolator 142 for isolating the low voltage of the microprocessor 112 from the high voltage of the heater 130, and a second signal conditioner 144 for conditioning the high voltage signal representative of the low voltage signal from the D/A converter 138 that passes through the isolator 142.

The conditioned signal from the signal conditioner 144 is sent to a gate drive 146 that drives the gate terminals of FETs 148 in the heater 130. The amount of gate voltage applied to the gate terminals of the FETs 148 determines how much power is applied to power resistors 150 in the heater 130, as discussed above. The amount of power applied to the resistors 150 determines how much heat is applied to the coolant fluid at system start-up. An isolated power supply 136, including a DC/DC converter, provides electrically isolated power to the load control system 134.

A low voltage power supply 152 supplies low voltage power to the microprocessor 112, the current measuring system 114, the voltage measuring system 124 and the control system 134.

Figure 4A:
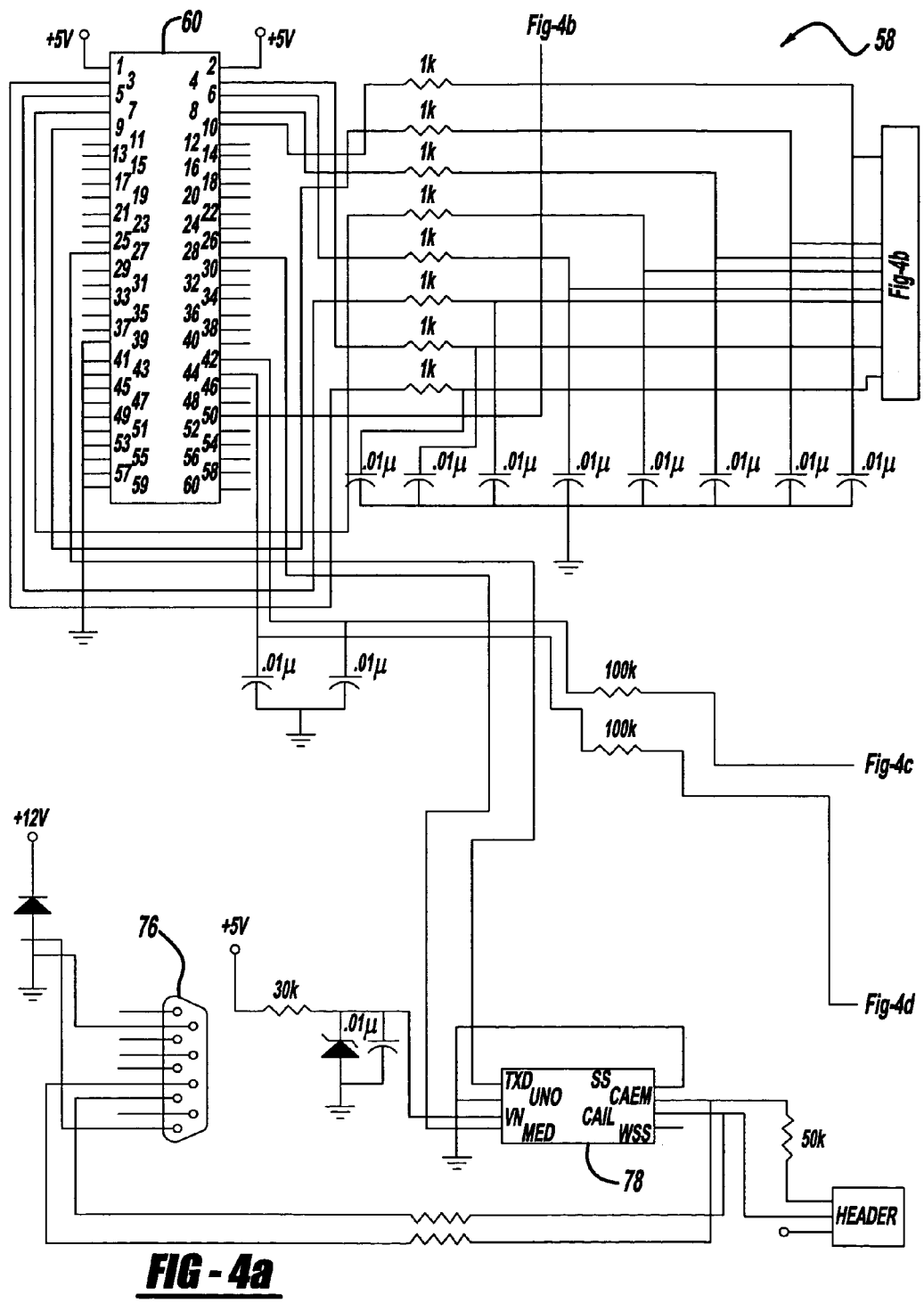
Figure 4C:
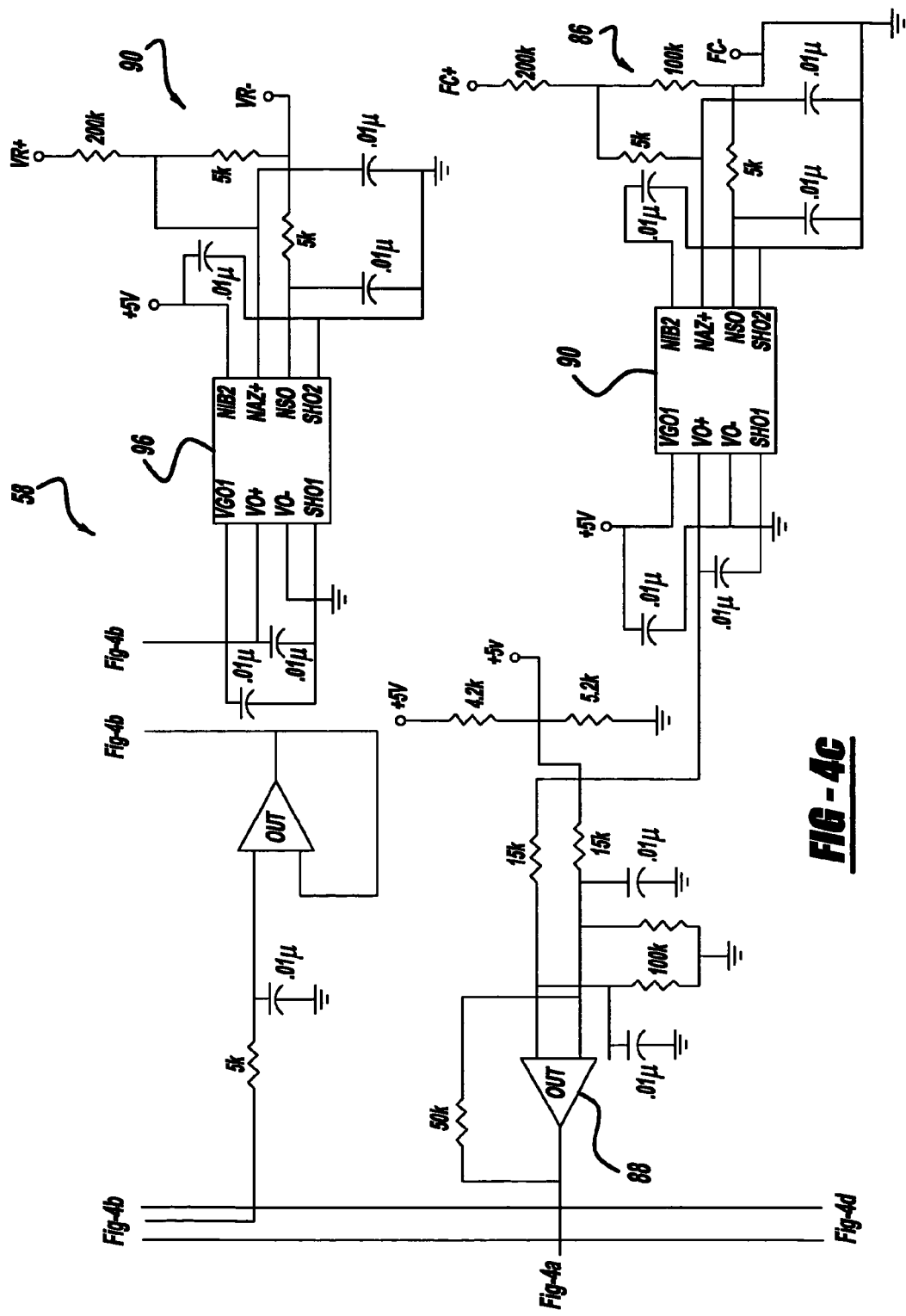
Figure 4D:
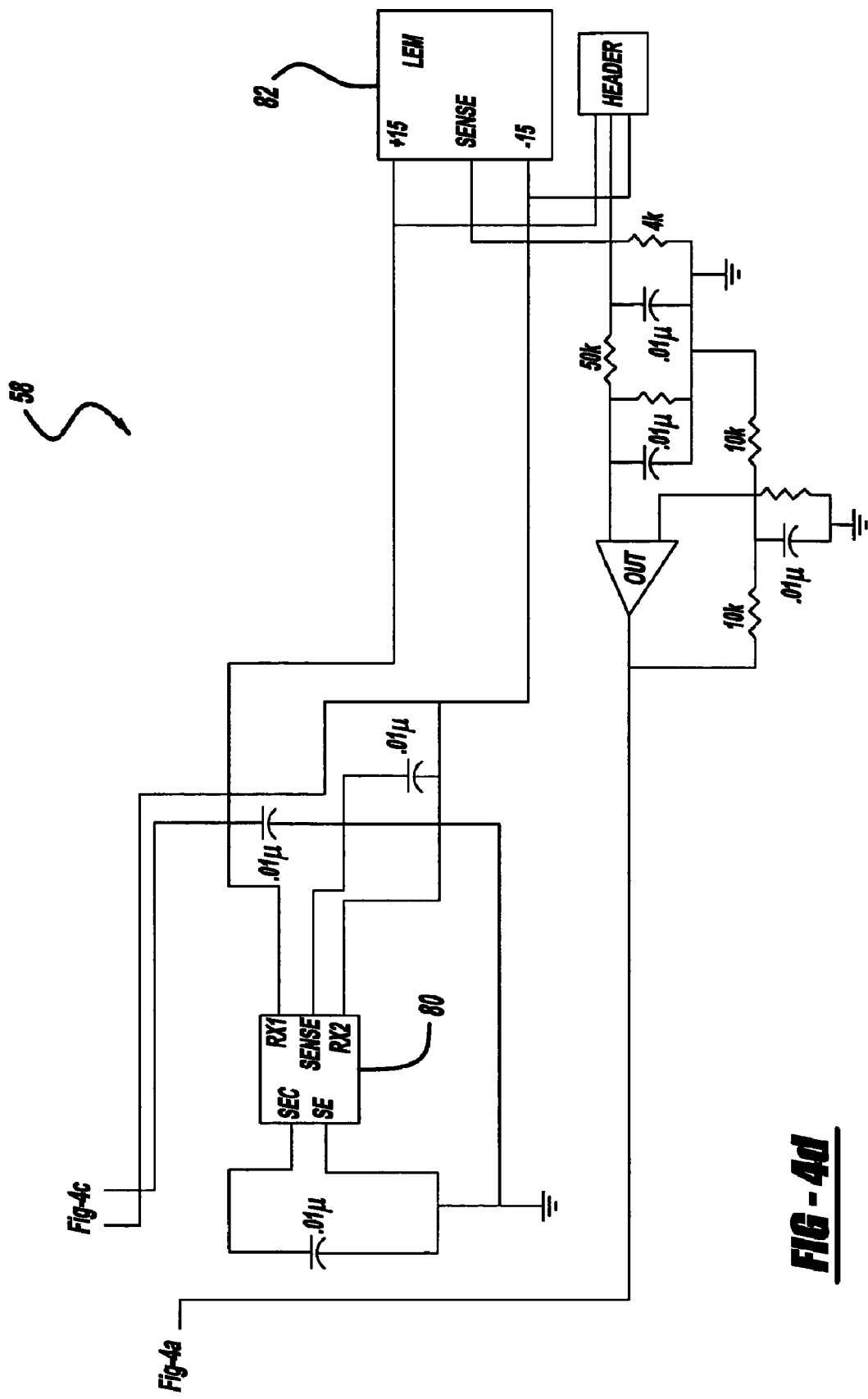

FIG. 4 is a detailed schematic diagram 58 of the control board 16 including a microprocessor 60 and a heater 62. The heater 62 includes a plurality of field effect transistors (FETs) 64 that drive power resistors 66 to heat the heat sink blocks 22-26. The gate terminal of each FET 64 is coupled to the output of an operational amplifier 68 that is controlled by the microprocessor 60. As the available power of the stack increases at system start-up, the gate voltage of the FETs 64 is increased to provide more power to the resistors 66 to generate more heat. The FETs 64 operate in their linear mode, allowing only the amount of current, which is required at a given voltage, to produce the power needed from the stack.

The microprocessor 60 generates digital output signals that determine how much output power is available from the output of the fuel cell stack. The digital output signals from the microprocessor 60 are converted to an analog signal by a D/A converter 72, which sends the analog signal to an isolator 74 that isolates the high voltage side of the heater 62 from the low voltage microprocessor 60. The signal from the isolator 74 on the high voltage side is sent to the amplifier 68. The microprocessor 60 receives external signals, such as programming signals, through a connector 76 and a CAN transceiver 78.

The control board 16 includes a current sensor 82 that measures the current through the heater 62. The output of the current sensor 82 is sent to an operational amplifier 84 that provides an output signal to an A/D converter on the microprocessor 60. The current sensor 82 senses the amount of current being drawn from the fuel cell stack. A DC/DC converter 80 converts a 12 volt input voltage to a suitable voltage for the current sensor 82. The heater unit 12 also includes a first voltage divider network 86 that measures the voltage across the heater 62 to provide a measure of the voltage at the output of the fuel cell stack. The divided voltage from the voltage divider 86 is sent to an isolator 90 that isolates the high voltage of the heater 62 from the microprocessor 60. The low voltage signal from the isolator 90 is sent to the microprocessor 60 through an operational amplifier 88. Therefore, the microprocessor 60 can determine the output power of the fuel cell stack based on the output voltage and the current of the fuel cell stack 12.

A second voltage divider network 92 measures the voltage across one of the resistors 66 and sends the measured voltage to an operational amplifier 94 through an isolator 96 that isolates the high voltage of the heater 62 from the microprocessor 60. The output of the operational amplifier is then sent to the microprocessor 60.

The control board 16 includes a voltage circuit 98 having a low voltage 5-volt regulator 100 and a high voltage 5-volt regulator 102 separated by a DC/DC isolator converter 104. The voltage regulator 100 provides 5 volts to the low voltage components, and the high voltage regulator 102 provides 5 volts to the high voltage components.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
a fuel cell stack providing output power; and
a heater circuit including a heater for heating the fuel cell stack during system start-up, said heater being electrically coupled to the output of the fuel cell stack, said heater circuit further including a controller for controlling the amount of heat provided by the heater, said controller monitoring stack voltage and current flow through the heater and controlling the amount of power the heater draws from the stack based on the amount of power that is available from the stack.

2. The system according to claim 1 wherein the heater heats a cooling fluid flowing through the fuel cell stack.

3. The system according to claim 2 wherein the heater heats the cooling fluid by heating a heat sink coupled to the coolant flow.

4. The system according to claim 1 wherein the heater includes a plurality of field effect transistors (FETs) and power resistors.

5. The system according to claim 4 wherein the field effect transistors (FETs) operate in their linear mode, allowing only the amount of current, which is required at a given voltage, to produce the power needed from the fuel cell stack.

6. The system according to claim 1 wherein the heater circuit includes a current sensor for measuring the current flow through the heater and the fuel cell stack.

7. The system according to claim 1 wherein the heater circuit includes a voltage divider network for measuring the voltage at the output of the fuel cell stack and the voltage across the heater.

8. The system according to claim 1 wherein the controller has controller area network capabilities.

9. The system according to claim 8 wherein the heater circuit includes a controller area network transceiver for providing external signals to the controller.

10. The system according to claim 1 wherein the fuel cell system is on a vehicle.

11. A fuel cell system comprising:
a fuel cell stack providing output power;
a coolant loop including a cooling fluid flowing there through for cooling the fuel cell stack; and
a heater circuit including a heater for heating the fuel cell stack during system start-up, said heater being electrically coupled to the output of the fuel cell stack, wherein the heater heats the cooling fluid flowing through the fuel cell stack, said heater circuit further including a controller for controlling the amount of heat provided by the heater based on the output of the fuel cell stack, a current sensor for measuring the current flow through the heater and the fuel cell stack, a first voltage divider network for measuring the voltage at the output of the fuel cell stack and the voltage across the heater, and a controller area network (CAN) transceiver for providing external CAN signals to the controller, said controller monitoring stack voltage and current flow through the heater and controlling the amount of power the heater draws from the stack based on the amount of power that is available from the stack.

12. The system according to claim 11 wherein the heater heats the coolant flow by heating a heat sink coupled to the coolant flow.

13. The system according to claim 11 wherein the heater includes a plurality of field effect transistors and power resistors.

14. The system according to claim 13 wherein the field effect transistors operate in their linear mode, allowing only the amount of current, which is required at a given voltage, to produce the power needed from the fuel cell stack.

15. The system according to claim 11 wherein the heater circuit further includes a second voltage divider network, said second voltage divider network measuring the voltage of one of the power resistors.

16. The system according to claim 11 wherein the fuel cell system is on a vehicle.

* * * * *